(12) United States Patent
Zeng et al.

(10) Patent No.: US 11,368,939 B2
(45) Date of Patent: Jun. 21, 2022

(54) SIDELINK ENHANCEMENT FOR USER EQUIPMENT

(71) Applicant: Apple Inc., Cupertino, CA (US)

(72) Inventors: Wei Zeng, San Diego, CA (US); Li Su, San Jose, CA (US); Dawei Zhang, Saratoga, CA (US); Haitong Sun, Irvine, CA (US)

(73) Assignee: Apple Inc., Cupertino, CA (US)

( * ) Notice: Subject to any disclaimer, the term of this patent is extended or adjusted under 35 U.S.C. 154(b) by 41 days.

(21) Appl. No.: 16/863,915

(22) Filed: Apr. 30, 2020

(65) Prior Publication Data

US 2020/0374857 A1 Nov. 26, 2020

Related U.S. Application Data

(60) Provisional application No. 62/852,728, filed on May 24, 2019.

(51) Int. Cl.
*H04W 72/04* (2009.01)
*H04W 24/08* (2009.01)
*H04W 68/00* (2009.01)
*H04W 72/12* (2009.01)

(52) U.S. Cl.
CPC ....... *H04W 72/0406* (2013.01); *H04W 24/08* (2013.01); *H04W 68/005* (2013.01); *H04W 72/12* (2013.01)

(58) Field of Classification Search
CPC .............................. H04W 68/00; H04W 72/04
See application file for complete search history.

(56) References Cited

U.S. PATENT DOCUMENTS

| | | | |
|---|---|---|---|
| 9,007,992 B2 | 4/2015 | Charbit et al. | |
| 9,374,796 B2 | 6/2016 | Li et al. | |
| 10,411,871 B2 | 9/2019 | Liu et al. | |
| 2020/0092685 A1* | 3/2020 | Fehrenbach | H04W 4/46 |
| 2020/0275412 A1 | 8/2020 | Kim et al. | |

* cited by examiner

*Primary Examiner* — Sulaiman Nooristany
(74) *Attorney, Agent, or Firm* — Kowert, Hood, Munyon, Rankin & Goetzel, PC

(57) ABSTRACT

Systems, apparatuses, and methods for performing cellular relay for an accessory device. A relay device may establish cellular communication with a base station and an accessory device. Establishing communication with the accessory device includes establishing synchronization with the accessory device using a cellular sidelink synchronization channel and a cellular broadcast channel. Establishing communication with the accessory device includes configuring resources for performing communication with the accessory device. Establishing communication with the accessory device includes indicating the resources to the accessory device. The relay device may relay information between the base station and the accessory device using the resources.

20 Claims, 5 Drawing Sheets

SIDELINK ENHANCEMENT FOR USER EQUIPMENT

PRIORITY INFORMATION

This application claims benefit of priority of U.S. provisional application Ser. No. 62/852,728 titled "Sidelink Enhancement for User Equipment" filed May 24, 2019, which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

The present application relates to wireless communication, including to techniques for a wireless device to perform system recovery in accordance with one or more energy budgets.

DESCRIPTION OF THE RELATED ART

Wireless communication systems are rapidly growing in usage. Further, wireless communication technology has evolved from voice-only communications to also include the transmission of data, such as Internet and multimedia content. Mobile electronic devices may take the form of smart phones or tablets that a user typically carries. Wearable devices (also referred to as accessory devices) are a newer form of mobile electronic device, one example being smart watches. Typically, wearable devices have relatively limited wireless communications capabilities and typically have smaller batteries than larger portable devices, such as smart phones and tablets. In general, it would be desirable to reduce the power requirements of communication devices. Therefore, improvements in the field are desired.

SUMMARY

Embodiments are presented herein of, inter alia, systems, apparatuses, and methods for a wireless device to perform cellular relay for an accessory device.

A relay device may establish cellular communication with a base station and an accessory device. Establishing communication with the accessory device includes establishing synchronization with the accessory device using a cellular sidelink synchronization channel and a cellular broadcast channel. Establishing communication with the accessory device includes configuring resources for performing communication with the accessory device. Establishing communication with the accessory device includes indicating the resources to the accessory device. The relay device may relay information between the base station and the accessory device using the resources.

The techniques described herein may be implemented in and/or used with a number of different types of devices, including but not limited to cellular phones, tablet computers, accessory and/or wearable computing devices, portable media players, cellular base stations and other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
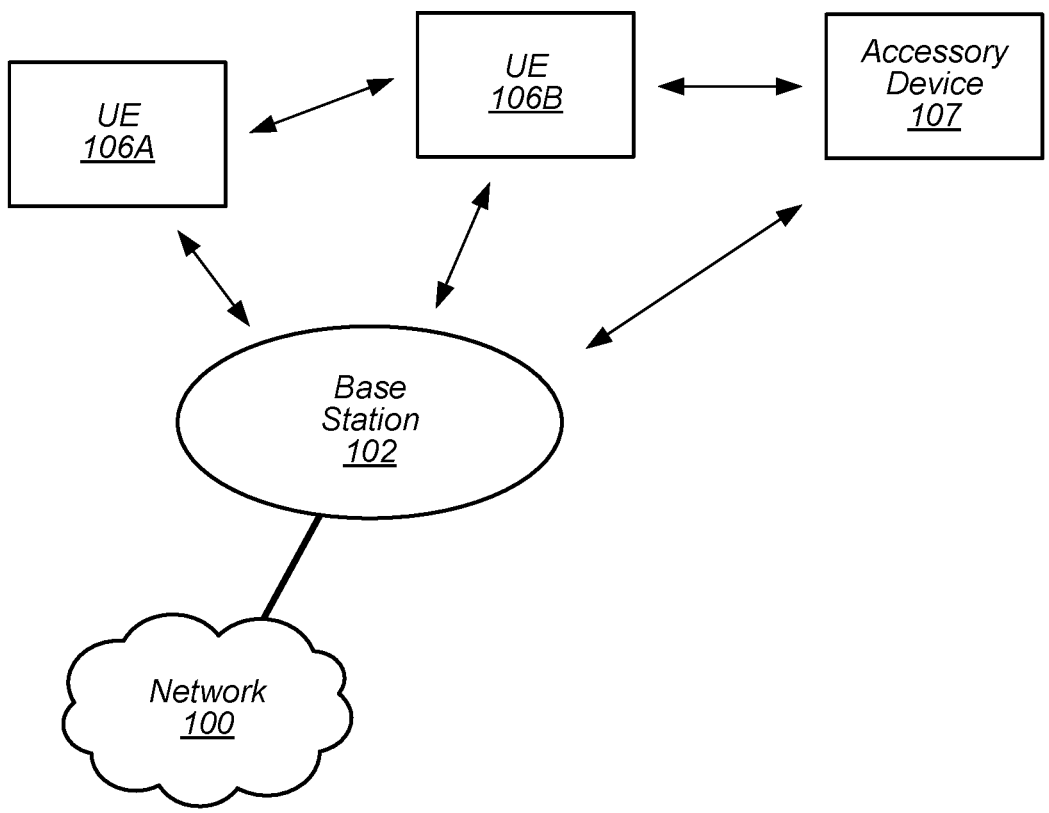
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present Patent Application:

UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, wearable devices (such as a smart watch), or other handheld devices, etc. In general, the term "UE" or "UE device" can be broadly defined to encompass any electronic, computing, and/or telecommunications device (or combination of devices) which is capable of wireless communication. UE devices may commonly be mobile or portable and easily transported by a user, though in some cases substantially stationary devices may also be configured to perform wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (a UE) which exhibits limited communication capabilities, or limited power, relative to a device that is not link budget limited, or relative to devices for which a radio access technology (RAT) standard has been developed. A UE that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
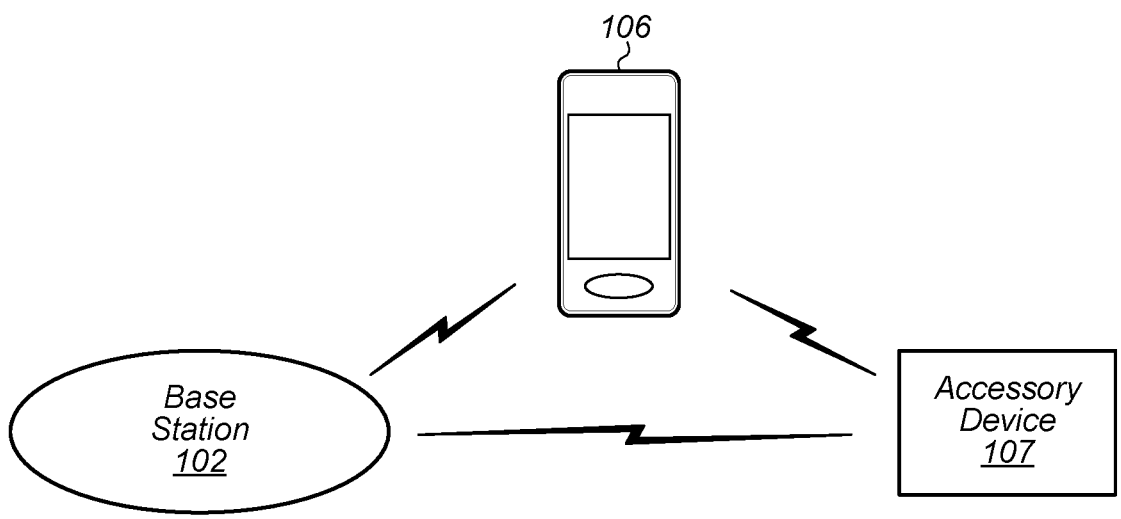
FIG. 2 illustrates an example system where an accessory device can selectively either directly communicate with a cellular base station or utilize the cellular capabilities of an intermediate or proxy device such as a smart phone, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device. The wireless embodiment described below is one example embodiment.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware that enables wireless communication with the UE devices 106A, 106B, and 107. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1xRTT, 1xEV-DO, HRPD, eHRPD), Wi-Fi, WiMAX etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of a plurality of wireless communication technologies. For example, a UE device 106/107 might be configured to communicate using one or more of GSM, UMTS, CDMA2000, WiMAX, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, the UE 106A and UE 106B may be capable of arranging and performing D2D communication (e.g., including D2D discovery communications) with each other even when out-of-coverage of the BS 102 and other cellular base stations.

The accessory device 107 includes cellular communication capability and hence is able to directly communicate with cellular base station 102. However, since the accessory device 107 is possibly one or more of communication, output power and/or battery limited, the accessory device 107 may in some instances selectively utilize the UE 106B as a proxy for communication purposes with the base station 102 and hence to the network 100. In other words, the accessory device 107 may selectively use the cellular communication capabilities of its companion device (e.g., UE 106B) to conduct its cellular communications. The limitation on communication abilities of the accessory device 107 can be permanent, e.g., due to limitations in output power or the radio access technologies (RATs) supported, or temporary, e.g., due to conditions such as current battery status, inability to access a network, or poor reception.

FIG. 2 illustrates an example accessory device 107 in communication with base station 102. The accessory device 107 may be a wearable device such as a smart watch. The accessory device 107 may include cellular communication capability and be capable of directly communicating with the base station 102 as shown. When the accessory device 107 is configured to directly communicate with the base station, the accessory device may be said to be in "autonomous mode."

The accessory device 107 may also be capable of communicating with another device (e.g., UE 106), referred to as a proxy device, intermediate device, or companion device, using a short range communications protocol; for example, the accessory device 107 may according to some embodiments be "paired" with the UE 106. Under some circumstances, the accessory device 107 may use the cellular functionality of this proxy device for communicating cellular voice/data with the base station 102. In other words, the accessory device 107 may provide voice/data packets intended for the base station 102 over the short range link to the UE 106, and the UE 106 may use its cellular functionality to transmit (or relay) this voice/data to the base station on behalf of the accessory device 107. Similarly, the voice/data packets transmitted by the base station and intended for the accessory device 107 may be received by the cellular functionality of the UE 106 and then may be relayed over the short range link to the accessory device. As noted above, the UE 106 may be a mobile phone, a tablet, or any other type of hand-held device, a media player, a computer, a laptop or virtually any type of wireless device. When the accessory device 107 is configured to indirectly communicate with the base station using the cellular functionality of an intermediate or proxy device, the accessory device may be said to be in "relay mode."

The UE 106 and/or 107 may include a device or integrated circuit for facilitating cellular communication, referred to as a cellular modem. The cellular modem may include one or more processors (e.g., processor elements) and various hardware components as described herein. The UE 106 and/or 107 (e.g., using associated processors) may perform any of the method embodiments described herein by executing instructions on one or more processors. Alternatively, or in addition, the one or more processors may be one or more programmable hardware elements such as an FPGA (field-programmable gate array), or other circuitry, that is configured to perform any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or 107 may include one or more antennas for communicating using two or more wireless communication protocols or radio access technologies (e.g., including any combination of CDMA, GSM, UMTS, LTE, 5G NR, and/or Wi-Fi, among others). In some embodiments, the UE device 106/107 might be configured to communicate using a single shared radio. The shared radio may couple to a single antenna, or may couple to multiple antennas (e.g., for MIMO) for performing wireless communications. Alternatively, the UE device 106/107 may include two or more radios. Other configurations are also possible. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

The accessory device 107 may be any of various types of devices that, in some embodiments, has a smaller form factor relative to a conventional smart phone, and may have one or more of limited communication capabilities, limited output power, or limited battery life relative to a conventional smart phone. As noted above, in some embodiments, the accessory device 107 is a smart watch or other type of wearable device. As another example, the accessory device 107 may be a tablet device, such as an iPad, with Wi-Fi capabilities (and possibly limited cellular communication capabilities), which is not currently near a Wi-Fi hotspot and hence is not currently able to communicate over Wi-Fi with the Internet. Thus, as defined above, the term "accessory device" refers to any of various types of devices that in some instances have limited or reduced communication capabilities and hence may selectively and opportunistically utilize the UE 106 as a proxy for communication purposes for one or more applications and/or RATs. As previously noted, when the UE 106 is capable of being used by the accessory device 107 as a proxy, the UE 106 may be referred to as a companion device to the accessory device 107.

In some embodiments, the UE 106 and/or UE 107 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 (and/or 107) and/or BS 102 may be configured to apply different "weight" to different antennas. The process of applying these different weights may be referred to as "precoding".

In some embodiments, the UE 106 and/or UE 107 may include separate transmit and/or receive chains (e.g., including separate antennas and other radio components) for each wireless communication protocol with which it is configured to communicate. As a further possibility, the UE 106 and/or UE 107 may include one or more radios which are shared between multiple wireless communication protocols, and one or more radios which are used exclusively by a single wireless communication protocol. For example, the UE 106 and/or UE 107 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
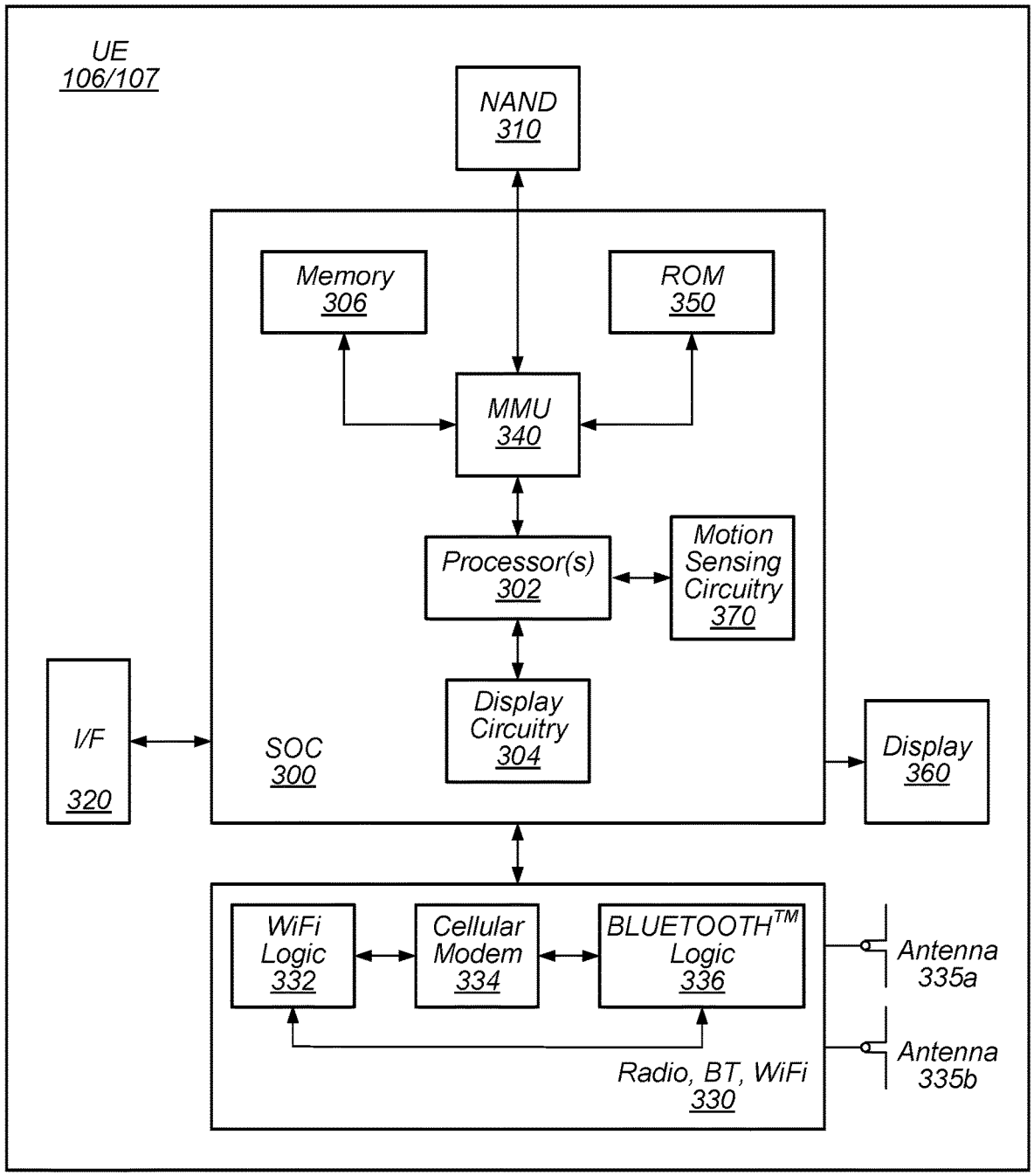
FIG. 3 is a block diagram illustrating an example wireless device, according to some embodiments.

FIG. 3—Example Block Diagram of a UE Device

FIG. 3 illustrates one possible block diagram of an UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310). The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using a plurality of wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. For example, one or more components of the wireless communication circuitry 330 (e.g., Wi-Fi logic 332, cellular modem 334, BT logic 336) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
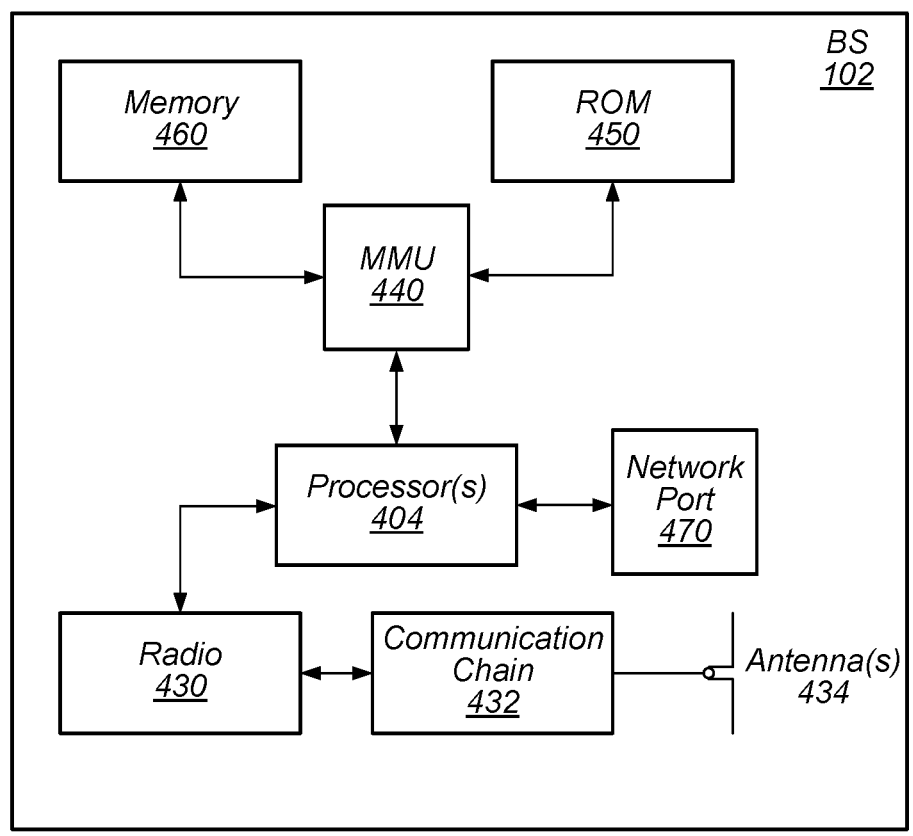
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., any combination of CDMA, GSM, UMTS, LTE, 5G NR, and/or Wi-Fi, among others).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
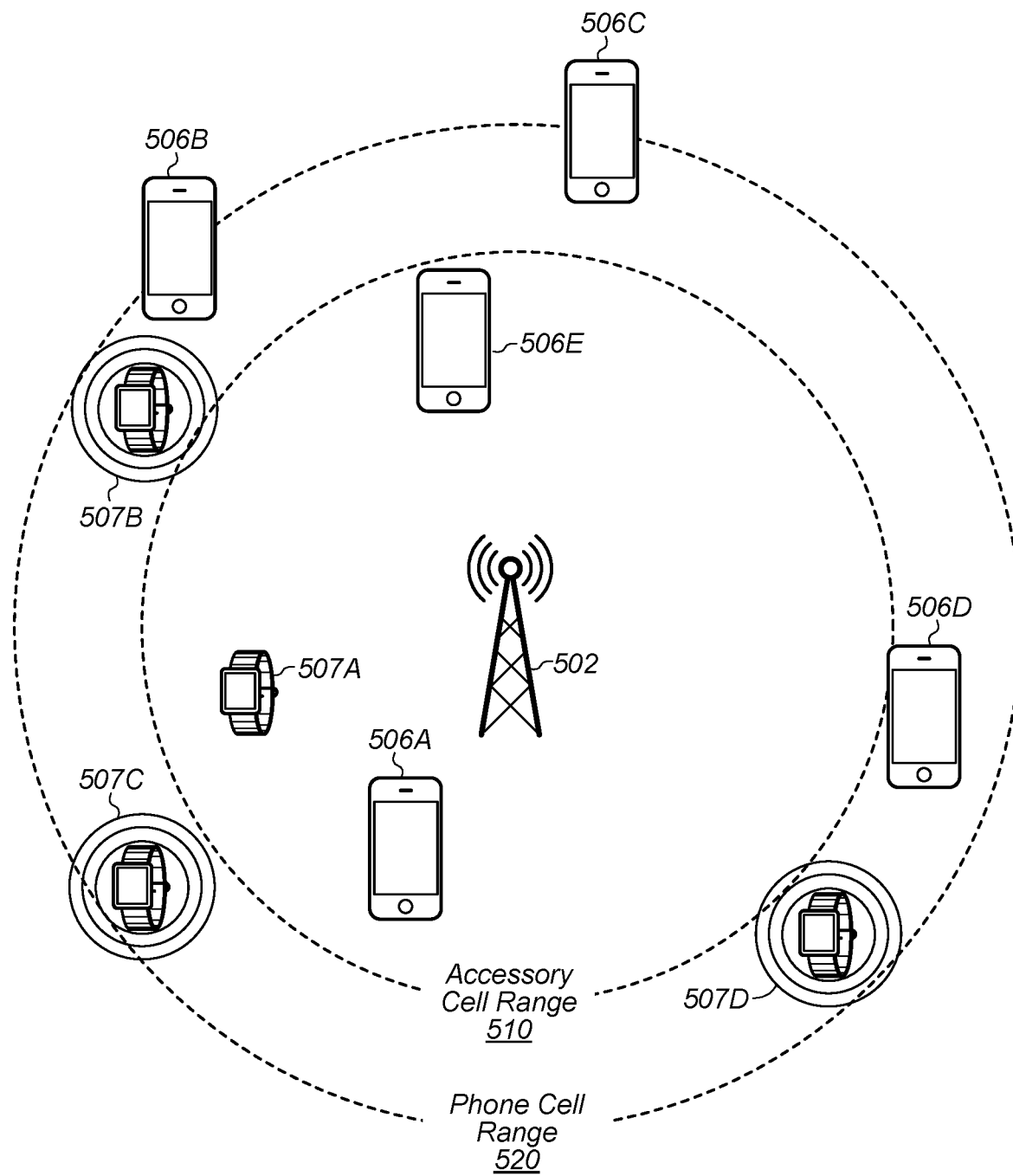
FIG. 5 illustrates a possible example coverage scenario for smartphones and smart watches, according to some embodiments.

FIG. 5—Example Coverage Scenario

FIG. 5 illustrates one possible example of a coverage scenario for cell phones (e.g., smartphones) and link budget limited devices (e.g., accessory devices such as smart watches), according to some embodiments. As shown, a base station 502 may provide a cell for a variety of wireless devices, including various cell phones 506 and various link budget limited devices 507. Such different types of devices may have differing characteristics that result in different effective communication ranges. Thus, as shown, the effective link budget limited device cell range 510 may be smaller than the effective cell phone cell range 520. As a result, while all of the illustrated cell phones (506A, 506B, 506C, 506D, 506E) may be within communicative range of the base station 502 and thus may be able to receive cellular communication service from the cell, only one of the illustrated link budget limited devices (507A) may be within communicative range of the base station 502, and the remainder of the illustrated link budget limited devices (507B, 507C, 507D) may be outside of communicative range of the base station 502. Unless there are one or more other cells within range of these link budget limited devices 507B-D, they may be unable to obtain cellular communication service and may accordingly experience cellular service loss.

Thus, since cellular base station deployment may at least in some instances be arranged to provide efficient cellular communication coverage for cell phones and other devices with similar cellular communication ranges, coverage scenarios such as illustrated in FIG. 5 may result in more common radio link failure and out-of-service events for smart watches and/or other devices with smaller than average cellular communication ranges (e.g., link budget limited devices).

Due to the nature of these link budget limited devices, various problems may develop, which may involve various messaging or other cellular related activities, such as those involving tracking area updates (TAU), random access channel (RACH) procedures, radio link failure (RLF), measurements and related reports, handovers, etc.

For example, some messaging procedures like Tracking Area Updates (TAU), RACH, and RLF activity are power hungry and cause a drain in battery, particularly for battery constrained devices, such as the link budget limited devices. Additionally, these link budget limited devices are more likely to encounter scenarios involving these messaging procedures because of their communication ranges, as shown in FIG. 5 (e.g., due to limited antenna designs typically found in accessory devices, such as watches). In particular, this impaired antenna capacity may cause these messaging scenarios to consume more power on the link budget limited devices than others, such as cell phones.

As discussed in more detail below, several messaging procedures can be avoided on link budget limited devices without loss of functionality, e.g., including RLFs, TAU messaging, measurement reports, and handovers.

Sidelink Enhancement

Existing NR specifications, e.g., R15/16 NR specifications, mainly focus on enhanced mobile broadband (eMBB) and ultra-reliable low latency communications (uRLLC). Accordingly, many UE requirements (e.g., from the operator side) are targeting those type of devices. For example, such UEs may need to support at least four receive antennas in the new NR spectrum. Additionally, these UEs may need to support minimal bandwidth from an RF perspective (e.g., minimal 100 MHz for FR1 and/or minimal 200 MHz for FR2).

However, NR will need to support more diverse types of UEs, e.g., wearables, sensors (MTC), lower cost phones, etc., targeting different use cases and require different design trade-offs. As discussed above, these types of devices (e.g., which may be referred to as "accessory devices") may have smaller batteries and/or need special power optimization. For example, an accessory device such as a smart watch may typically have a few hundreds mAh battery versus a smart phone which may typically have a few thousands mAh battery.

Additionally, these types of UEs (e.g., accessory devices) may have reduced antenna efficiency due to space and placement limitations. For example, accessory devices may typically have ~10 dB loss in antenna gain compared to a smart phone. Additionally, despite typically having fewer numbers of antennas, the accessory devices may still need to support multiple bands and coexistence with other RATs. Accordingly, accessory UEs may still need to achieve similar coverage yet reduce power consumption.

In some embodiments, as previously indicated, accessory devices may support both a direct link (e.g., when a companion device, such as a phone is not nearby) to a base station and a relay link using the companion device (e.g., when in proximity to the companion device). As noted above, a direct link to cellular typically suffers from poor coverage and reduced battery life.

Indirect links using Bluetooth™ may have one or more of the following characteristics. The range may be limited (e.g., ~10 m or less), such as when using a Bluetooth™ class 2 power amplifier (e.g., 4 dBm (2.5 mW)), instead of using a cellular power amplifier, e.g., that may be greater than 20 dBm. The throughput may be limited (e.g., 1-2 Mbps). Additionally, using Bluetooth™ may result in processing at higher level layers than may be necessary using cellular sidelink. Thus, delay may be further reduced if relay is done at lower layer (e.g., using cellular). With Bluetooth™ communication may be performed only in unlicensed band, as opposed to cellular, which may be able to communicate in licensed or unlicensed bands.

Indirect Links via Cellular Sidelink

Existing LTE device to device (D2D) designs adopt a generalized discovery procedure, allowing all devices to discover all other devices within a proximity. However, for accessory devices (e.g., wearables) and companion devices (e.g., phones acting as a relay), this design may be overly robust and unnecessarily costly, since these devices only need to identify or pair with a specific device (or a specific set of devices). For example, a smart watch may be configured to only pair with a known phone (e.g., owned and/or operated by the same user) rather than being configured to discover any phone. Similarly, the companion device does not need to relay for any other device, but may only perform relay functions for a specific accessory device (or a set of specific and/or known accessory devices). Accordingly, relaying using cellular sideband may be performed in a simpler manner (as compared to generic D2D procedures), e.g., with reduced or no discovery.

In some embodiments, sidelink pairing may be performed by using a cellular (e.g., NR) sidelink synchronization (sync) channel and a cellular (e.g., NR) sidelink broadcast channel. In some embodiments, the accessory device may be slaved to the timing of the companion device (which may also referred to as "relay device", e.g., when acting as a relay between the base station and the accessory device). The accessory device may synchronize to the timing of the companion device in any of various manners. For example, the accessory device and the relay device may both synchronize to a cellular base station, and then may use that synchronization to communicate with each other. In some embodiments, the cellular base station may broadcast information usable by various pairs of accessory devices and relay devices to quickly communicate with each other. For example, by using the information broadcast by the base station (e.g., for synchronization or for determining when to search or pair with each other), the relay device may avoid or minimize its own broadcasting (e.g., of synchronization information).

Alternatively, or additionally, the accessory device and relay device may be configured to synchronize to each other, e.g., based on information broadcast by the relay device. For example, the relay device (and/or the accessory device) can send out periodic synchronization signals, which includes timing information. The relay device (and/or the accessory device may send (e.g., with the synchronization signals) broadcast information, which may include device identification information and/or some basic information how to connect with the device (e.g., the relay device). The searching device (e.g., the accessory device) may search for this synchronization and/or broadcast information. Once detected, the searching device may read the broadcast information and initiate the connection and/or pairing procedures. In some embodiments, the synchronization or pairing may be initialized by a user of one of the devices, as desired.

Once synchronized, the relay device (e.g., and/or accessory devices) may configure resources for sidelink paging, re-synchronization, as well as for data communication. The configuration may include BWP (bandwidth part), CORESET, and/or search space configuration in NR sidelink. In some embodiments, the configuration may include initial default resources (e.g., used for control information), as well as list of resources pools for later stage (e.g., for data or other control information). The two devices may perform authentication to complete pairing. Any of various authentication procedures could be used.

In some embodiments, it is possible that the two devices may discover each other using a non-cellular RAT (e.g., Bluetooth™ or WLAN) to initially coordinate the cellular relay link. For example, the two devices may discover each other over Bluetooth™ determine timing, synchronization, and/or other parameters, e.g., related to establishing communication or pairing over a cellular relay link, and then pair and/or synchronize over the cellular link based on that information.

DRX Over Sidelink

Relay devices may need to keep monitoring (e.g., in a periodic manner) data requests from accessory devices. Additionally, the accessory devices may need to keep monitoring (e.g., periodically) for paging information from the relay devices (e.g., as relayed from the cellular network). In order to save power, the relay device and accessory device should negotiate discontinuous reception (DRX). In some embodiments, the two devices may determine a semi-static DRX pattern for the devices to reach each other. For the accessory device, the DRX may be used to monitor paging and/or scheduling information transmitted by the relay device. For the relay device, the DRX may be used to monitor scheduling requests and/or grantless data transmitted by the accessory device.

Sidelink Resource Allocation

Sidelink resource allocation (e.g., for paging, scheduling requests, or other communications) may be performed in a variety of different ways.

In one embodiment, the resources may be automatically or autonomously selected by the relay device and/or accessory device. For example, the base station (e.g., the gNB) may configure and/or transmit a list of network resources for sidelink relay and notify relay devices (e.g., through SIB broadcast in downlink). The relay devices may then select one out of the preconfigured resources (e.g., randomly or according to some other selection procedure). The relay device may then configure the accessory device to use the selected sidelink resource (e.g., by transmitting to the wearable device information, such as BWP, CORESET and search space, among other information). In one embodiment, this transmission may be done either through sidelink broadcast or by using a default initial resource (e.g. from SIB in downlink from the base station). The resources may include both directions of the sidelink, e.g., one for monitoring sidelink control information (SCI) from the relay device and one for sending SR or data to the relay device.

In some embodiments, the resources may be assigned by the network, e.g., semi-statically. For example, the base station (e.g., gNB) may semi-statically configure sidelink resources (e.g., BWP, CORESET, and search space) to the relay device and/or the wearable device. For example, in one embodiment, these sidelink resources may be assigned initially, when the relay device and/or accessory device register to the network (e.g., at the same time or separately, as desired). Alternatively, or additionally, the sidelink resources may be forwarded to the accessory device after the relay device obtains the information from the network. Relay and accessory devices can further negotiate the partition of resources to be used in each direction (e.g., for paging or other transmissions from the relay device to the accessory device and for scheduling requests or other transmissions, such as data, from the accessory device to the relay device.

Relay Data Resource Allocation

In some embodiments, the resources used for control information (e.g., to monitor paging, scheduling requests, or other control information) may be different from the resources used for data transmissions. For example, paging, SR, and control information generally have relatively small payloads, but are monitored more often than data. Data transmission is usually performed less often, but typically involves much larger payloads. Accordingly, in some embodiments, resource allocation (e.g., BWP configuration) may be different between data transmission and control information monitoring between the relay device and the accessory device.

In one embodiment, the resources used for data transmissions between the accessory device and the relay device may be automatically or autonomously selected by the relay device (e.g., and/or the accessory device). For example, the network may semi-statically configure another resource pool for data, separate from the control resource pool, e.g., through Uu link broadcast. Accordingly, the resources may be automatically selected from the data resource pool (e.g., by the relay device) to send data or to schedule data from accessory device.

Alternatively, the resources used for data transmissions between the accessory device and the relay device may be assigned (e.g., dynamically) by the network. For example, the relay device may request resources when there is data to send to the accessory device or in response to receiving a scheduling request (SR) from the accessory device. In response, the network may dynamically assign sidelink resources for performing the data resources to the relay device.

Closed-Loop Power Control and CSI Feedback over Sidelink

As mentioned above, one advantage of a cellular based sidelink is the existing larger power amplifier used for a direct cellular link. For example, a cellular PA may typically be 23 dBm as compared to 4 dBm for Bluetooth™. The higher peak power PA provides larger flexibility in terms of coverage range.

Accordingly, in some embodiments, closed loop power control over sidelink may be important to quickly adjust the accessory device transmit power to minimize potential interference and/or to save power. In some embodiments, power control may involve two aspects. For example, the relay device may decide on a target SNR for the sidelink (relay link), and the target SNR can potentially be adjusted based on the observed block error rate over the sidelink. Additionally, the relay device may monitor and measure the link quality and compare it to the target SNR, and accordingly send power control commands to the accessory device (e.g., to increase or reduce transmission power).

CSI feedback over sidelink may also be helpful to achieve better link efficiency. For example, the accessory device may also monitor the sidelink radio condition quality and notify the relay device (e.g., via channel state information (CSI) reports), so that the relay device can schedule transmission accordingly, e.g., by selecting an appropriate data rate and modulation format.

Switching Between Direct Link and Sidelink

In most cases, relay over sidelink is more power efficient for the accessory device. However, in certain radio conditions (e.g. relay device is far from the accessory device or is locked inside a car, among other scenarios), the direct link to the network from the accessory device may be the favorable link. According to various embodiments, the relay device or the accessory device may select and decide between direct link and relay through sidelink.

In some embodiments, the accessory device may automatically or autonomously decide. For example, the accessory device may decide whether to communicate with the cellular network directly or via the relay device based on wireless link conditions (e.g., based on RSRP, SINR, and/or any one or more metrics related to link conditions).

In one embodiment, the accessory device may measure the link condition (e.g., RSRP) of the direct link to the base station (RSRP_1). The accessory device may also measure the link condition (e.g., RSRP) of the sidelink to the relay device (RSRP_2). The accessory device may compare the two to determine which link to use for communication to the network. For example, a difference between the link conditions could be compared to a threshold (e.g., sidelink may be used if RSRP_1−RSRP_2<threshold_1).

In one embodiment, the accessory device may decide whether to use direct or indirect based, e.g., only, on the sidelink link condition (e.g., deciding to use sidelink if RSRP_2>threshold_2). The accessory device may preferentially pick one of direct or sidelink based on other factors, such as its battery condition, active applications, data transmission patterns, etc.

Alternatively, or additionally, the relay device may automatically or autonomously decide. In some embodiments, relay nodes may decide whether to relay for wearable depending on other metrics, such as its own link quality over the cellular link and/or its own battery condition, among other possibilities.

In one embodiment, the relay device may make a decision based on link conditions (although this may be in conjunction with other factors, such as battery life). For example, the accessory device may periodically report measurement of its direct link quality to the relay device (e.g., RSRP_1). The relay device may measure its own direct link quality (e.g., RSRP_3). The relay device may decide to stop relay based on a comparison of the difference of the link qualities (e.g., if RSRP_3−RSRP_1<threshold_3).

Alternatively, or additionally, the relay device may make the decision based on its own link quality. For example, the relay device may decide not to support relay if RSRP_3<threshold_4. As another possibility, the relay device may decide not to support relay if the relay link between the relay device and the accessory device is less than a threshold.

In some embodiments, the relay device can indicate activation/deactivation of relay services to the accessory device through any of various means, such as via a paging message or sidelink control channel. For example, the SCI format may support a special flag bit for activation/deactivation of relay service.

Figure 6:
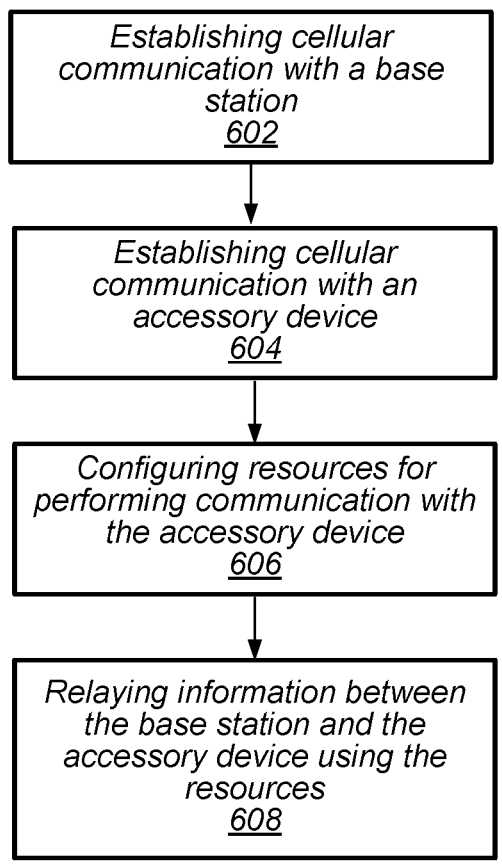
FIG. 6 is a flowchart diagram illustrating exemplary methods for a wireless device to perform various messaging actions with improved power savings, according to some embodiments.

FIG. 6—Performing Relaying for an Accessory Device

FIG. 6 illustrates exemplary techniques for performing relaying for an accessory device. Aspects of the method of FIG. 6 may be implemented by a wireless device, such as the UE(s) 106/107, in communication with one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 402, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 602, the relay device may establish cellular communication with a base station. The relay device may establish timing synchronization with the base station as part of this procedure.

In 604, the relay device may establish cellular communication with an accessory device. In some embodiments, establishing cellular communication with the accessory device includes establishing synchronization with the accessory device using a cellular sidelink synchronization channel and a cellular broadcast channel.

Synchronization of timing of the relay device and the accessory device may be based on separate synchronizations with the base station (e.g., where both devices synchronize to the base station first). Alternatively, or additionally, synchronization of timing may be based on timing information provided by the relay device, e.g., using one or both of the sidelink synchronization channel and/or the cellular broadcast channel.

In 606, the relay device may configure resources for performing communication with the accessory device. The relay device may indicate the resources to the accessory device.

In some embodiments, configuring resources includes configuring a first set of resources for communicating control information. For example, the relay device may receive an indication of a first pool of resources available for sidelink communication from the base station, and the relay device may automatically configure the first set of resources by selecting from the first pool of resources indicated by the base station. As another possibility, configuring the first set of resources may be performed in response to network assignment (e.g., by the base station) of the first set of resources for the accessory device (e.g., for communication between the relay device and the accessory device).

In some embodiments, configuring resources includes configuring a second set of resources for communicating data between the relay device and the accessory device (e.g., different than a first set of resources for communicating control information between the relay device and the accessory device, although a single pool of resources is also envisioned). Similar to above, the relay device may receive an indication of the second pool of resources available for sidelink communication from the base station, and the relay device may automatically select the second set of resources from the second pool of resources. As another possibility, configuring the second set of resources may be performed in response to network assignment (e.g., by the base station) of the second set of resources for the accessory device (e.g., for communication of data between the relay device and the accessory device).

In 608, the relay device may relay information between the base station and the accessory device using the resources.

The relay device and the accessory device may establish discontinuous reception (DRX) parameters for: the relay device for receiving information from the accessory device, and the accessory device for receiving information from the relay device.

The relay device and the accessory device may perform closed-loop power control to adjust the accessory device transmission power.

The relay device may receive CSI feedback from the accessory device.

The relay device may measure radio link conditions between the relay device and the base station and cease to provide relay services to the accessory device based on the radio link conditions. The relay device may also receive radio link conditions between the accessory device and the base station. Accordingly, ceasing to provide relay services to the accessory device may be further based on the radio link conditions between the accessory device and the base station. The relay device may indicate activation or deactivation of providing relaying services to the accessory device using a sidelink control information (SCI) flag in a sidelink control channel.

Alternatively, or additionally, the relay device may cease to provide relay services to the accessory device based on radio link conditions of the accessory device. The radio link conditions of the accessory device may include radio link conditions between the accessory device and the base station. The radio link conditions of the accessory device may further include radio link conditions between the accessory device and the relay device.

Exemplary Embodiments

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

The following paragraphs provide example embodiments.

In one embodiment, a method for operating a relay device includes: establishing cellular communication with a base station; establishing cellular communication with an accessory device, wherein said establishing cellular communication with the accessory device includes: establishing synchronization with the accessory device using a cellular sidelink synchronization channel and a cellular broadcast channel; configuring resources for performing communication with the accessory device; and indicating the resources to the accessory device; and relaying information between the base station and the accessory device using the resources.

In some embodiments, configuring resources includes configuring a first set of resources for communicating control information.

In some embodiments, the control information comprises paging and scheduling request information.

In some embodiments, the method may include receiving an indication of a first pool of resources available for sidelink communication from the base station; wherein said configuring the first set of resources is performed automatically by the relay device, wherein the first set of resources are selected from the first pool of resources.

In some embodiments configuring the first set of resources is performed in response to network assignment of the first set of resources for the accessory device.

In some embodiments, configuring resources includes configuring a second set of resources for communicating data.

In some embodiments, the method includes receiving an indication of a second pool of resources available for sidelink communication from the base station; wherein said configuring the second set of resources is performed automatically by the relay device, wherein the second set of resources are selected from the second pool of resources.

In some embodiments, configuring the second set of resources is performed in response to dynamic network assignment of the second set of resources for the accessory device.

In some embodiments, the method includes establishing discontinuous reception (DRX) parameters for: the relay device for receiving information from the accessory device; and the accessory device for receiving information from the relay device.

In some embodiments, the method includes performing closed-loop power control to adjust the accessory device transmission power.

In some embodiments, the method includes receiving CSI feedback from the accessory device.

In some embodiments, the method includes measuring radio link conditions between the relay device and the base station; and ceasing to provide relay services to the accessory device based on the radio link conditions.

In some embodiments, the method includes receiving radio link conditions between the accessory device and the base station; wherein said ceasing to provide relay services to the accessory device is further based on the radio link conditions between the accessory device and the base station.

In some embodiments, the method includes indicating said ceasing to the accessory device using a sidelink control information (SCI) flag in a sidelink control channel.

In some embodiments, the method includes ceasing to provide relay services to the accessory device based on radio link conditions of the accessory device.

In some embodiments, the radio link conditions of the accessory device include radio link conditions between the accessory device and the base station.

In some embodiments, the radio link conditions of the accessory device further include radio link conditions between the accessory device and the relay device.

In some embodiments, a method for operating a relay device includes establishing cellular communication with a base station; establishing cellular communication with an accessory device, wherein said establishing cellular communication with the accessory device includes: establishing synchronization with the accessory device using a cellular synchronization channel over direct cellular link from the base station; configuring resources for performing communication with the accessory device; and indicating the resources to the accessory device; and relaying information between the base station and the accessory device using the resources.

In some embodiments, an apparatus includes a processor (or a processing element or processing circuitry) configured to cause a device to perform the method of any of the preceding paragraphs.

In some embodiments, a device includes an antenna; a radio coupled to the antenna; and a processing element coupled to the radio; wherein the device is configured to implement a method according to any of the preceding paragraphs.

In some embodiments, a memory medium includes program instructions that, when executed, cause a device to implement a method according to any of the preceding paragraphs.

In some embodiment, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium stores instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, including:
a processor, wherein the processor is configured to cause a relay device to:
establish cellular communication with a base station;
establish cellular communication with an accessory device, wherein said establishing cellular communication with the accessory device includes:
establishing synchronization with the accessory device using a cellular sidelink synchronization channel and a cellular broadcast channel;
configuring resources for performing communication with the accessory device, wherein the resources include different bandwidth part configurations for data communication and first control information between the relay device and the accessory device, wherein the first control information comprises paging and scheduling request information;
indicating the resources to the accessory device; and
relay information between the base station and the accessory device using the resources.

2. The apparatus of claim 1, wherein configuring resources includes configuring a first set of resources for communicating control information.

3. The apparatus of claim 2, wherein the processor is further configured to:
receive an indication of a first pool of resources available for sidelink communication from the base station;
wherein said configuring the first set of resources is performed automatically by the relay device, wherein the first set of resources are selected from the first pool of resources.

4. The apparatus of claim 2, wherein configuring the first set of resources is performed in response to network assignment of the first set of resources for the accessory device.

5. The apparatus of claim 2, wherein configuring resources includes configuring a second set of resources for communicating data.

6. The apparatus of claim 1, wherein the processor is further configured to:
establish discontinuous reception (DRX) parameters for:
the relay device for receiving information from the accessory device; and
the accessory device for receiving information from the relay device.

7. The apparatus of claim 1, wherein the processor is further configured to:
perform closed-loop power control to adjust the accessory device transmission power.

8. The apparatus of claim 1, wherein the processor is further configured to:
measure radio link conditions between the relay device and the base station; and
cease to provide relay services to the accessory device based on the radio link conditions.

9. The apparatus of claim 8, wherein the processor is further configured to:
receive radio link conditions between the accessory device and the base station;
wherein said ceasing to provide relay services to the accessory device is further based on the radio link conditions between the accessory device and the base station.

10. A device, including:
an antenna; a radio coupled to the antenna; and a processor coupled to the radio, wherein the processor is configured to cause the device to:
establish cellular communication with a base station;
establish cellular communication with an accessory device, wherein said establishing cellular communication with the accessory device includes:
establishing synchronization with the accessory device using a cellular synchronization channel over a direct cellular link from the base station;
configuring resources for performing communication with the accessory device, wherein the resources include different bandwidth part configurations for data communication and first control information between the device and the accessory device, wherein the first control information comprises paging and scheduling request information;
indicating the resources to the accessory device; and
relay information between the base station and the accessory device using the resources.

11. The device of claim 10, wherein configuring resources includes:
configuring a first set of resources for communicating control information; and
configuring resources includes configuring a second set of resources for communicating data.

12. The device of claim 11,
wherein said configuring the first set of resources is performed automatically by the device, wherein the first set of resources are selected from a first pool of resources;
wherein said configuring the second set of resources is performed automatically by the device, wherein the second set of resources are selected from a second pool of resources.

13. The device of claim 11, wherein:
configuring the first set of resources is performed in response to network assignment of the first set of resources for the accessory device; and
configuring the second set of resources is performed in response to network assignment of the second set of resources for the accessory device.

14. The device of claim 10, wherein the processor is further configured to:
establish discontinuous reception (DRX) parameters for:
the device for receiving information from the accessory device; and
the accessory device for receiving information from the device.

15. The device of claim 10, wherein the processor is further configured to:
cease to provide relay services to the accessory device based on radio link conditions of the accessory device.

16. The device of claim 15, wherein the radio link conditions of the accessory device include radio link conditions between the accessory device and the base station.

17. The device of claim 16, wherein the radio link conditions of the accessory device further include radio link conditions between the accessory device and the device.

18. The device of claim 10,
wherein the first control information includes paging and scheduling requests.

19. The apparatus of claim 1,
wherein the first control information includes paging and scheduling requests.

20. A method for operating a device, the method comprising:
establishing cellular communication with a base station;
establishing cellular communication with an accessory device, wherein said establishing cellular communication with the accessory device includes:
establishing synchronization with the accessory device using a cellular synchronization channel over a direct cellular link from the base station;
configuring resources for performing communication with the accessory device, wherein the resources include different bandwidth part configurations for data communication and first control information between the relay device and the accessory device, and wherein the first control information includes paging and scheduling requests; and
indicating the resources to the accessory device; and
relaying information between the base station and the accessory device using the resources.

\* \* \* \* \*